United States Patent [19]

Edwards et al.

[11] Patent Number: 4,973,115
[45] Date of Patent: Nov. 27, 1990

[54] FREE EXPANSION PSEUDO-ZOOM FOR LASER PROJECTOR

[75] Inventors: Byron Edwards, Orange; George W. Stewart, Jr., Costa Mesa, both of Calif.

[73] Assignee: Ford Aerospace Corporation, Newport Beach, Calif.

[21] Appl. No.: 455,661

[22] Filed: Dec. 22, 1989

[51] Int. Cl.[5] ............................................. G02B 26/08
[52] U.S. Cl. ...................................... 350/6.1; 350/6.4; 350/286; 350/102; 350/560
[58] Field of Search ................. 350/6.1, 6.4, 102, 286, 350/519, 544, 560, 639; 356/4, 152, 19; 250/203 R

[56] References Cited

U.S. PATENT DOCUMENTS

| | | | |
|---|---|---|---|
| 3,471,239 | 10/1969 | Woodson | 350/286 |
| 3,516,743 | 6/1970 | McKown et al. | 356/4 |
| 3,517,982 | 6/1970 | Bonardi | 350/286 |
| 3,764,192 | 10/1973 | Wheeler | 350/6.6 |
| 3,865,467 | 2/1975 | Von Thuna | 350/102 |
| 3,954,340 | 5/1976 | Blomqvist et al. | 250/203 R |
| 3,961,179 | 6/1976 | Kuffer | 250/203 R |
| 3,989,942 | 11/1976 | Waddoups | 250/203 R |
| 4,063,819 | 12/1977 | Hayes | 356/152 |
| 4,097,141 | 6/1978 | Warner | 350/102 |
| 4,100,404 | 7/1978 | Johnson et al. | 455/608 |
| 4,161,652 | 7/1979 | Moreau et al. | 250/203 R |
| 4,168,908 | 9/1979 | Cubalchini | 356/152 |
| 4,209,224 | 6/1980 | Stewart, Jr. | 350/6.4 |
| 4,446,363 | 5/1984 | Lakin et al. | 250/203 R |
| 4,559,445 | 12/1985 | Hedin et al. | 250/203 R |
| 4,647,761 | 3/1987 | Cojan et al. | 250/203 R |
| 4,864,222 | 9/1989 | Aoshima et al. | 350/102 |

Primary Examiner—Bruce Y. Arnold
Assistant Examiner—Loha Ben
Attorney, Agent, or Firm—Harry G. Weissenberger; Edward J. Radlo; Keith L. Zerschling

[57] ABSTRACT

The angle of divergence of a laser beam (29) is controlled without significant variation of beam power by using a movable corner cube (18) to vary the length of the optical path of a noncollimated beam (12) so as to present a beam of varying diameter to a telescope lens (26). In a second aspect of the invention, the beam is made insensitive to vibration of the corner cube (18) by covering a portion of its beam-receiving face with a second reflector (32) which causes the beam to make a second pass through the corner cube (18) in a parallel but opposite direction therey cancelling any beam displacement caused by the vibration of the corner cube (18).

8 Claims, 4 Drawing Sheets

FREE EXPANSION PSEUDO-ZOOM FOR LASER PROJECTOR

FIELD OF THE INVENTION

This invention relates to devices for varying the angle of divergence of a laser beam, and more particularly to a device using a movable corner cube to provide the zoom function and avoid reducing the power in the beam when the divergence is increased.

BACKGROUND OF THE INVENTION

Missiles are conventionally steered by a laser beam transmitted from the launch site. The single circular laser beam continuously scans a field of view which is controlled to have substantially the same linear size at the missile as it flies down range. A sensor on the missile detects the beam when it scans across the missile, and electronics on the missile are able to determine where in the scanned field of view the missile is located. The missile electronics then steer the missile so as to maintain it in the center of the scanned field of view.

In order to prevent any point in the field of view from remaining unscanned, yet provide every point in the field of view with an unambiguous scan position signal, the beam needs to be wide at close range, and to become narrower as the range increases. In the prior art, this was done by providing an iris in front of the scanning device. The problem with this arrangement, however, was that as the iris closed to cause an increase in beam divergence, the beam power was greatly reduced due to the blocking of a portion of the beam. This caused significant problems in practice because the sensor on the missile needs to look through the rocket exhaust plume, and therefore needs a strong laser signal to achieve an acceptable signal-to-noise ratio.

Prior art references in this field are as follows: U.S. Pat. No. 3,516,743 to McKown et al. which describes a scanning mechanism for a laser projection system but does not address the issue of controlling the divergence of the beam; U.S. Pat. No. 3,764,192 to Wheeler which likewise describes a scanning method for a laser beam but does not address a zoom function; U.S. Pat. No. 3,954,340 to Blomqvist et al. in which a zoom lens system for target return tracking is mentioned but not described; U.S. Pat. No. 3,961,179 to Kuffer et al. which describes a scanning method but does not consider a zoom function; U.S. Pat. No. 3,989,942 to Waddoups, which describes a responder and laser beam encoder, but again does not consider zoom control of the beam; U.S. Pat. No. 4,063,819 to Hayes which likewise describes only a scanning method; U.S. Pat. No. 4,100,404 to Johnson et al. in which a pseudo-zoom function is implemented in a beam projector by varying the size of the projected image and the size of the illumination spot; U.S. Pat. No. 4,161,652 to Moreau et al. which also shows only a scanning method; U.S. Pat. No. 4,168,908 to Cubalchini which describes a precision pointing and tracking system, but again does not deal with a zoom function; U.S. Pat. No. 4,209,244 to Stewart, Jr. which describes a way of scanning a pattern in orthogonal directions with a single galvanometer, the zoom function being implemented by having several laser sources of different sizes; U.S. Pat. No. 4,446,363 to Lakin et al. in which a projection system is described but no zoom function is considered; U.S. Pat. No. 4,559,445 to Hedin et al. which also describes a projection system that does not have a zoom function; and U.S. Pat. No. 4,647,761 to Cojan et al. which describes a means of steering the field of view of an optical system over wide angles but does not contain a zoom function.

DESCRIPTION OF THE INVENTION

The invention provides a method of increasing the divergence of a laser beam (12) without increasing the loss of power by causing the beam (12) emitted by the laser (10) to pass through a movable corner cube (18). Moving the corner cube (18) has the effect of lengthening and shortening the optical path between the laser (10) and the telescope lens (24) without blocking any part of the beam (12). The width of the beam (12) as it strikes the telescope lens (24), and consequently the width of the beam (29) transmitted toward the missile, can thus be adjusted.

In a second aspect of the invention, transverse displacement of the beam (12) due to vibration of the corner cube (18) is prevented by mounting in front of the corner cube (18) a dihedral prism (32) which causes the beam (12) to pass through the corner cube a second time in a manner that cancels out the beam displacement effect of any transverse or rotational motion of the corner cube (18). This feature has the additional advantage of doubling the length change of the beam (12) produced by any given displacement of the corner cube (18).

DESCRIPTION OF THE PREFERRED EMBODIMENT

Figure 1A:
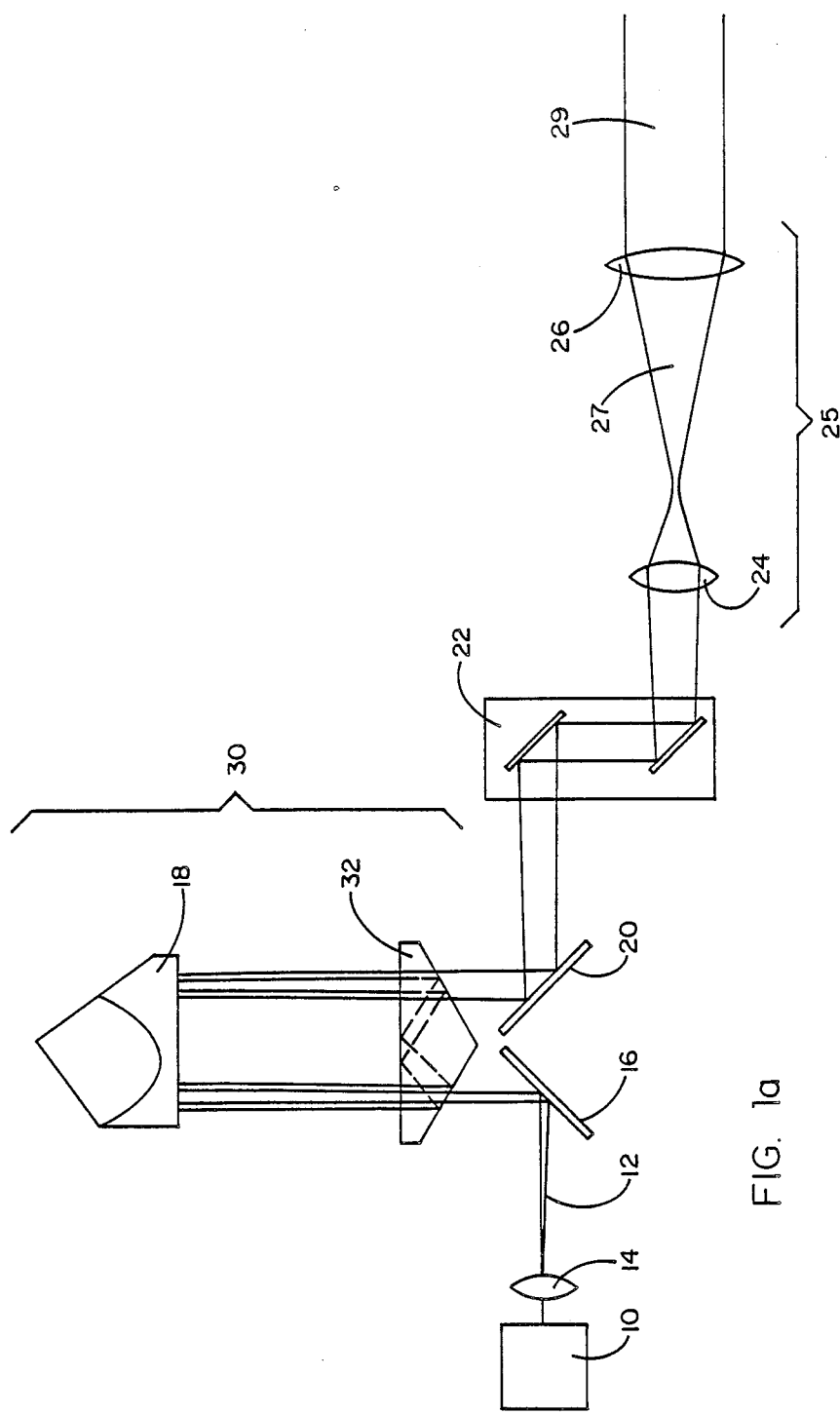
FIG. 1a is a diagram, partly in block form, illustrating the optical path of the inventive device in the long-range configuration.
Figure 1B:
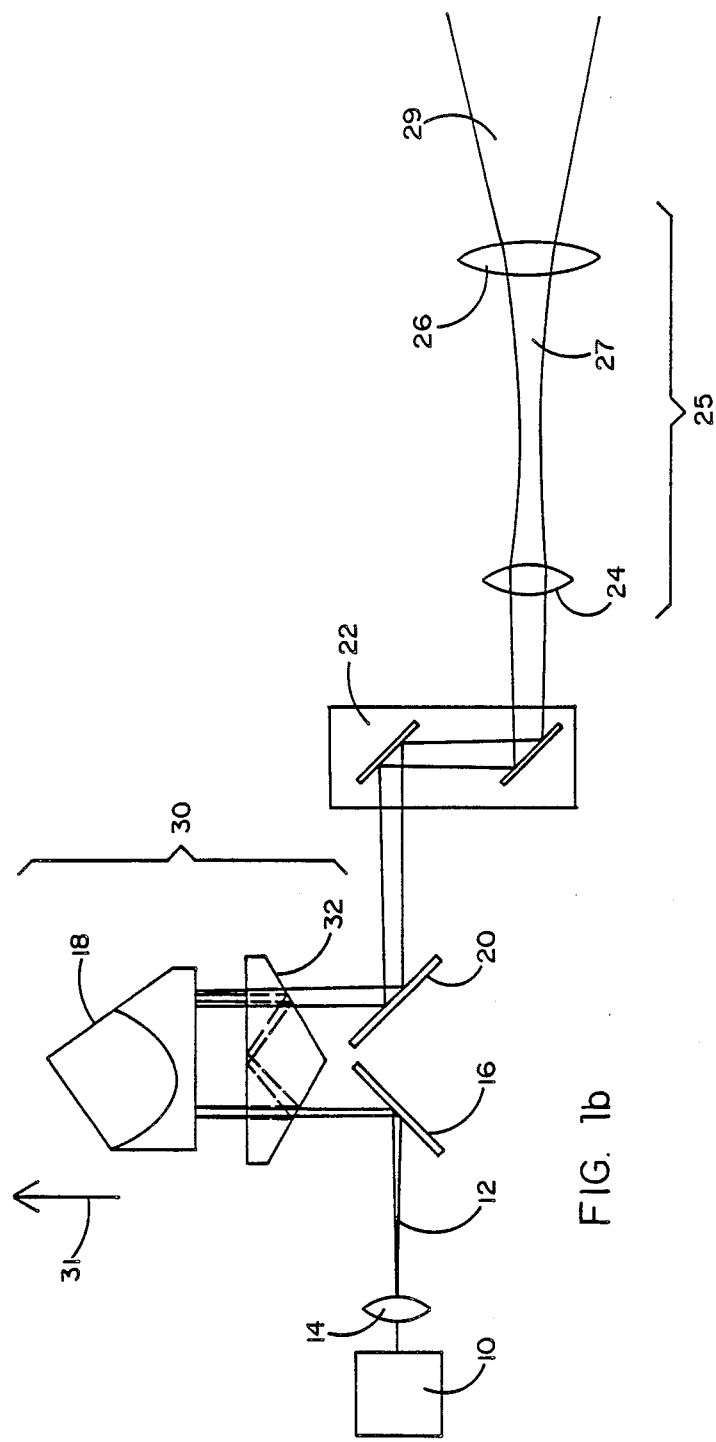
FIG. 1b is a diagram similar to FIG. 1a but showing the optical path in the short-range configuration.

As best seen in FIGS. 1a and 1b, a laser 10 projects a beam 12. A mirror 16 deflects the beam 12 toward a trihedral prism 18 acting as a corner cube, from which it emerges after two passes through the corner cube 18 and one pass through the dihedral prism 32 in a parallel but laterally displaced position. A mirror 20 reflects the beam 12 back onto its original path toward a conventional scanning mechanism schematically indicated at 22. At its emergence from the scanning mechanism 22, the beam 12 passes through lenses 24 and 26 of the telescope 25 and then proceeds down range. The beam 12 when viewed from the vicinity of the first telescope lens 24, appears to originate from a real or virtual waist (depending on the nature of the laser design) located at or near the laser 10. The first telescope lens 24 transforms the Gaussian beam generated by the laser 10 into another Gaussian beam 27 with different optical properties. This transformed beam has a real waist located somewhere beyond telescope lens 24. In this embodiment, with the corner cube 18 located as required for the long range configuration (FIG. 1a), the telescope lenses 24, 26 are positioned such that the waist relayed by lens 24 is located at the front focal point of the telescope objective lens 26. This configuration causes the objective lens 26 to transform the second Gaussian beam 27 into a third Gaussian beam 29 on the other side of the objective lens 26 with its own unique optical properties. This third Gaussian beam 29 has, according to the laws of physics, a waist located at the second focal point of the objective lens 26. Also, the waist located at the second focal point of lens 26 will be the largest diameter waist into which a lens with the focal length of lens 26 can transform the waist located at the first focal point of lens 26. Further, lens 26 is sized such that its diameter is approximately 1.12 times the $1/e^2$ diameter of the laser beam passing through the lens with the system in the long range configuration of FIG. 1a. All other optical components and/or apertures are preferably sized so that they are at least 1.5 times the $1/e^2$ diameter of the largest laser beam that passes through them as the system is zoomed from the short range (FIG. 1b) to the long range (FIG. 1a) configuration. Smaller apertures will tend to degrade system performance. In practice, the objective lens 26 is usually made as large as practical, and then other hardware and design parameters are adjusted such that the diameter of lens 26 is about 1.12 times the $1/e^2$ diameter of the laser beam it projects when the system is in the long range configuration of FIG. 1a. This 1.12 value for the aperture-to-spot-size ratio yields the maximum on-axis gain i.e. maximum far-field on-axis power density and is the desired design point.

With a system designed to meet the constraints just described, if the optical path from 10 to 24 is shortened, the $1/e^2$ diameter of the beam projected by the objective lens 26 will diminish, causing the desired increase in the beam divergences while maintaining approximately the same total beam power.

In this application, before the missile is launched, the optical path between the laser 10 and the first telescope lens 24 is made sufficiently short (FIG. 1b) to cause the projected beam divergence to increase to whatever value is required to provide an adequate beam diameter at the missile "capture range". Then, as the missile flies down range, the corner cube 18 is moved in the direction of arrow 31 to increase the optical path length between the laser 10 and the first telescope lens until the long range design configuration of FIG. 1a is attained. The motion of prism 18 is programmed so as to always provide a beam of adequate diameter at the missile's range at any given time. In addition, as the missile flies down range, the amplitude of the scan pattern of scanner 22 decreases.

In FIG. 1a, the corner cube 18 is distant from the mirrors 16, 20. Consequently, the beam 12 has adequate distance to expand to its maximum design size when it reaches the focusing lens 24 after passing through the scanner 22. As a result, a wide beam 27 impinges upon the telescope lens 26, and the beam 29 is highly collimated as it leaves lens 26.

By contrast, in FIG. 1b, the corner cube 18 is close to the mirrors 16, 20. Consequently, the beam 12 traverses a shorter path length between mirrors 16, 20. By the time beam 12 reaches focusing lens 24, it is of much smaller diameter than in FIG. 1a, and beam 27 impinges upon telescope lens 26 as a narrow beam so as to cause beam 29 to diverge substantially after leaving lens 26. Thus, the divergence of the beam 29 can be changed to match the desired range by moving the corner cube 18 up and down in FIGS. 1a and 1b by an appropriate mechanism (not shown). One or more extra lenses such as lens 14 may or may not be necessary within the beam 12 to control the initial size of the laser beam 12 that projects into the corner cube zoom assembly. Lenses such as lens 14 may be necessary depending on the details (inherent divergence) of the laser 10 and the extent of the missile range over which the system must operate.

Figure 2A:
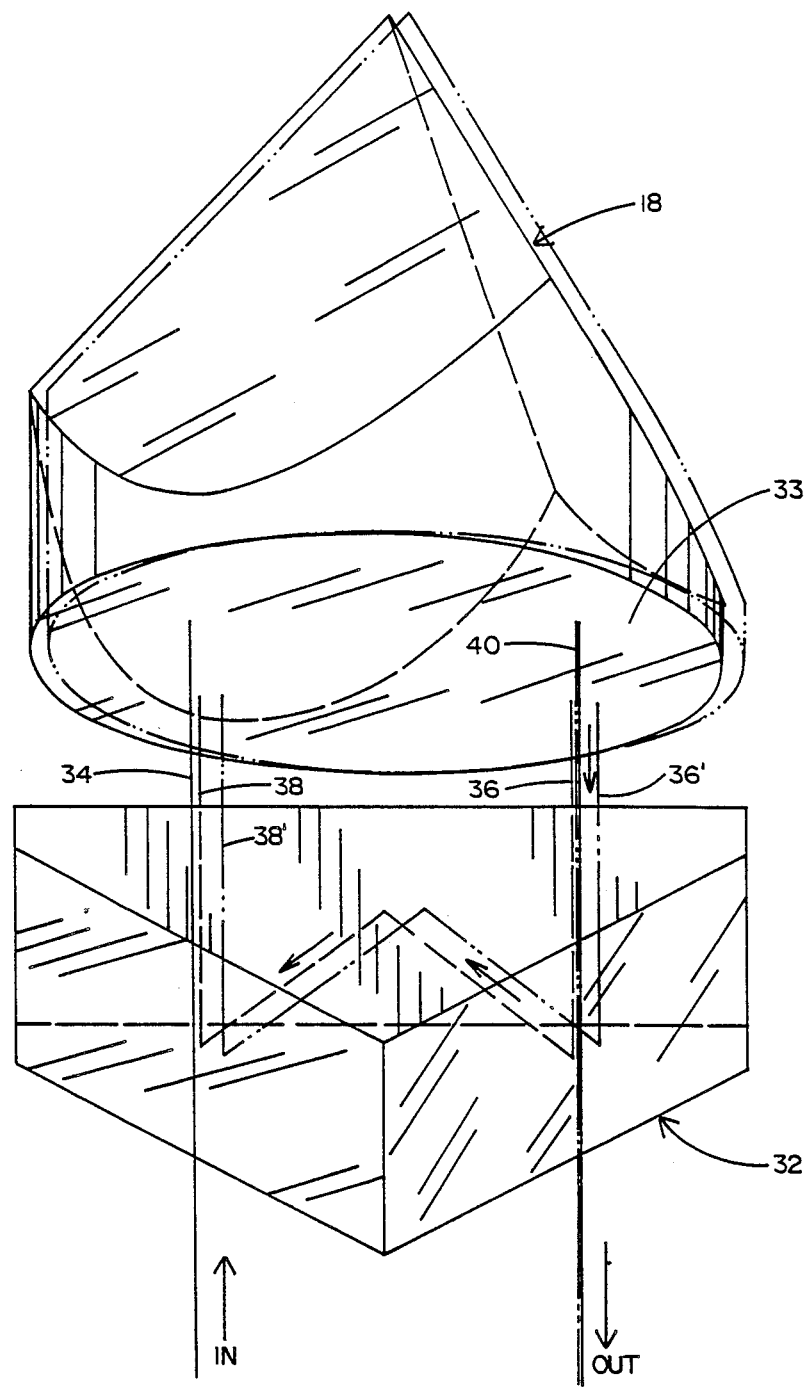
FIG. 2a is a perspective view of the reflector prism assembly.
Figure 2B:
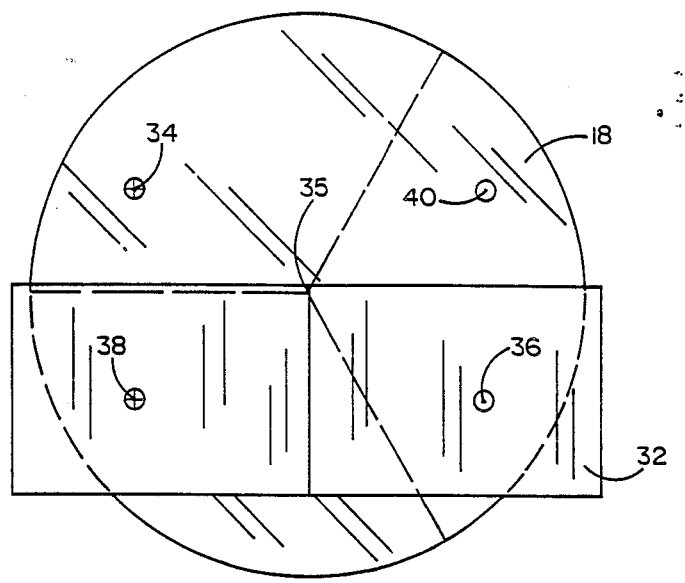
FIG. 2b is an elevational view of the reflector prism assembly.
Figure 2C:
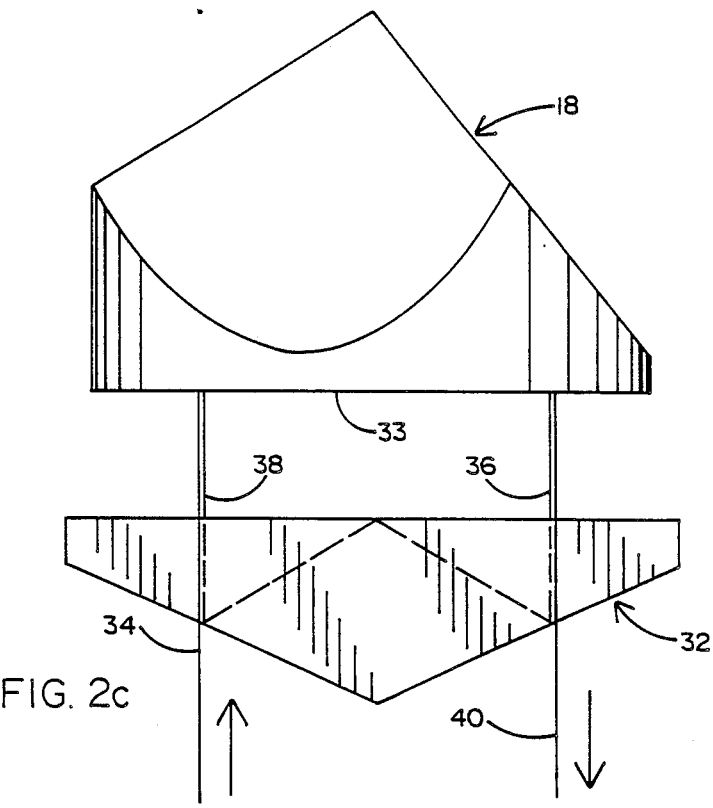
FIG. 2c is a plan view of the reflector prism assembly.

FIGS. 2a through 2c show the details of the vibration-compensating corner reflector prism assembly 30 embodying a second feature of this invention. The assembly 30 is composed of the corner cube 18 and a dihedral prism 32. The dihedral prism 32 is positioned in front of a portion of the front face 33 of corner cube 18 in such a manner as to reflect the beam exiting from corner cube 18 at 36 back into the corner cube 18 at 38.

The path of beam 12 in the reflector assembly 30 is shown in FIG. 2a through 2c. It is an inherent property of a corner cube to reflect any beam impinging at 34 in a direction parallel to, but laterally displaced to 36 from, the beam impinging at 34. The amount of lateral displacement depends upon the distance of the impinging beam's axis with respect to the reflector's axis 35 (FIG. 2b), and upon its inclination with respect thereto. When a beam impinges perpendicularly upon the front face 33 of the corner cube 18, it emerges perpendicularly to the face 33 at a point directly opposite, and equidistant from, the vertex or axis 35 of the corner cube 18.

In the device of this invention, any vibration which causes the corner cube 18 to move transversely to its intended direction of movement, or to rotate with respect to it, results in an unintended lateral displacement of the beam 12 exiting from the corner cube 18. This of course interferes with the scanning process and is therefore highly undesirable.

The present invention compensates for vibration by providing the dihedral prism 32 in the path of the exit beam from corner cube 18. The prism 32 causes the beam 12 to pass through the corner cube 18 a second time but in the opposite direction. As a result, any displacement of the beam 12 on the first pass is cancelled out by an equal and opposite displacement on the second pass.

As shown in FIGS. 2a through 2c, the beam 12 enters the corner cube 18 at 34 and is reflected thereby to direction 36 (36' if the corner cube 18 is displaced to the position shown in dot-dash lines). The dihedral prism 32 reflects it back into the corner cube 18 at 38 or 38', respectively, and the beam 12 finally exits the assembly 30 at 40 regardless of the transverse movement of corner cube 18 because the displacement of the beam 12 on the second pass is equal but opposite.

It will be seen that the invention provides a simple, vibration-proof way of changing the divergence of a laser beam without blocking any more of the beam for the high-divergence configuration than was blocked for the low-divergence configuration.

We claim:

1. Apparatus for varying the divergence angle of a laser beam without substantial power loss, comprising:
   (a) a laser;
   (b) telescope means in the path of said beam for transmitting said beam with a divergence angle depending upon the length of the optical path between said laser and said telescope; means and
   (c) movable reflecting means interposed in the path of said beam between said laser and said telescope means for varying the length of said optical path.

2. The apparatus of claim 1, in which said movable reflecting means is a corner cube.

3. The apparatus of claim 2, further comprising second reflecting means positioned to reflect said beam back into said corner cube upon exit therefrom, whereby any displacement of said beam caused by transverse motion or rotation of said corner cube is cancelled out.

4. The apparatus of claim 3, in which said second reflecting means is a dihedral prism.

5. The apparatus of claim 1, further comprising scanning means interposed in the path of said beam for causing said beam to scan a field of view.

6. The apparatus of claim 5, in which said scanning means is interposed between said movable reflecting means and said telescope means.

7. A motion-insensitive corner cube assembly, comprising:
   (a) a corner cube acting as a first reflector;
   (b) means for causing an incident beam to enter said corner cube at a first location and to exit therefrom at a second location; and
   (c) a second reflector for intercepting said beam upon exit from said corner cube and reflecting it back into said corner cube at a third location so as to cause it to exit therefrom at a fourth location such that any displacement of said beam upon its first exit from said corner cube caused by transverse motion or rotation of said corner cube is cancelled upon its second exit therefrom;
   (d) said second reflector being positioned in the path of said beam at said second and third locations but not said first and fourth locations.

8. The assembly of claim 7, in which said second reflector is a dihedral prism covering a portion, but less than all, of the face of said corner cube upon which said beam impinges.

* * * * *